US012003063B2

(12) United States Patent
Copper

(10) Patent No.: US 12,003,063 B2
(45) **Date of Patent: *Jun. 4, 2024**

(54) SELECTIVELY PLATED PLASTIC PART

(71) Applicant: FCI USA LLC, Etters, PA (US)

(72) Inventor: Charles Copper, Hummelstown, PA (US)

(73) Assignee: FCI USA LLC, Etters, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/179,315

(22) Filed: Mar. 6, 2023

(65) Prior Publication Data

US 2023/0318237 A1 Oct. 5, 2023

Related U.S. Application Data

(63) Continuation of application No. 17/356,156, filed on Jun. 23, 2021, now Pat. No. 11,600,957, which is a continuation of application No. 16/741,562, filed on Jan. 13, 2020, now Pat. No. 11,056,841, which is a continuation of application No. 15/759,091, filed as (Continued)

(51) Int. Cl.
*H01R 13/6599* (2011.01)
*H01R 13/502* (2006.01)
*H01R 13/6581* (2011.01)
*H01R 13/6594* (2011.01)

(52) U.S. Cl.
CPC ....... *H01R 13/6599* (2013.01); *H01R 13/502* (2013.01); *H01R 13/6581* (2013.01); *H01R 13/6594* (2013.01)

(58) Field of Classification Search
CPC .............. H01R 13/6599; H01R 13/502; H01R 13/6581; H01R 13/6594
See application file for complete search history.

(56) References Cited

U.S. PATENT DOCUMENTS 3,745,515 A 7/1973 Michaels
4,600,480 A 7/1986 Coombes et al.
5,386,344 A 1/1995 Beaman et al.
(Continued)

FOREIGN PATENT DOCUMENTS

CN 1349117 A 5/2002
CN 1436381 A 8/2003
(Continued)

*Primary Examiner* — Jean F Duverne
(74) *Attorney, Agent, or Firm* — Wolf, Greenfield & Sacks, P.C.

(57) ABSTRACT

An electrical connector including a housing and electrical conductor plating. The housing includes a first member and a second member. The first member is made of plastic and forms at least one first contact receiving channel therein. The second member is attached around the first member, and the first and second members form at least one second contact receiving channel therebetween. The electrical conductor plating is on the first member. The electrical conductor plating includes at least one first section along the at least one first contact receiving channel and at least one second section along an exterior side of the first member at the at least one second contact receiving channel. The first and second sections of the electrical conductor plating are electrically separate from one another.

28 Claims, 2 Drawing Sheets

Related U.S. Application Data application No. PCT/US2016/051079 on Sep. 9, 2016, now Pat. No. 10,535,959.

(60) Provisional application No. 62/217,184, filed on Sep. 11, 2015.

(56) References Cited

U.S. PATENT DOCUMENTS

| | | | |
|---|---|---|---|
| 5,468,918 | A | 11/1995 | Kanno et al. |
| 6,053,744 | A | 4/2000 | Gray et al. |
| 6,109,959 | A | 8/2000 | Burlinson et al. |
| 6,176,744 | B1 | 1/2001 | Zito et al. |
| 6,276,945 | B1 | 8/2001 | Hayward et al. |
| 6,532,315 | B1 | 3/2003 | Hung et al. |
| 7,316,585 | B2 | 1/2008 | Smith et al. |
| 7,374,459 | B2 | 5/2008 | Lin |
| 7,670,180 | B2 | 3/2010 | Gerard et al. |
| 8,167,652 | B1 | 5/2012 | Ju |
| 8,382,522 | B2 | 2/2013 | Glover et al. |
| 8,465,469 | B2 | 6/2013 | Brightbill |
| 8,540,434 | B2 | 9/2013 | Kruchowski et al. |
| 8,905,785 | B2 | 12/2014 | Johnescu |
| 9,450,344 | B2 | 9/2016 | Cartier, Jr. et al. |
| 10,535,959 | B2 | 1/2020 | Copper |
| 11,018,402 | B2 | 5/2021 | Smith et al. |
| 11,056,841 | B2 | 7/2021 | Copper |
| 11,600,957 | B2 | 3/2023 | Copper |
| 2002/0168149 | A1 | 11/2002 | Nakura et al. |
| 2005/0017818 | A1 | 1/2005 | Kinayman et al. |
| 2006/0141861 | A1 | 6/2006 | Darley et al. |
| 2007/0188257 | A1 | 8/2007 | Brunker et al. |
| 2008/0220658 | A1 | 9/2008 | Caveney et al. |
| 2011/0256763 | A1 | 10/2011 | De Geest et al. |
| 2011/0274394 | A1 | 11/2011 | Kruchowski et al. |
| 2012/0244728 | A1 | 9/2012 | Rathburn |
| 2012/0319891 | A1 | 12/2012 | Edvardsson et al. |
| 2013/0050841 | A1 | 2/2013 | Mathai et al. |
| 2014/0174781 | A1 | 6/2014 | Do |
| 2014/0209371 | A1* | 7/2014 | Minich .................. H05K 1/116 174/266 |
| 2014/0291009 | A1 | 10/2014 | Schreier et al. |
| 2015/0168652 | A1 | 6/2015 | Hamamoto |
| 2018/0287308 | A1 | 10/2018 | Copper |
| 2020/0076039 | A1 | 3/2020 | Smith |
| 2020/0153172 | A1 | 5/2020 | Copper |
| 2021/0384603 | A1 | 12/2021 | Smith et al. |
| 2022/0021162 | A1 | 1/2022 | Copper |

FOREIGN PATENT DOCUMENTS

| | | | |
|---|---|---|---|
| CN | 1437781 | A | 8/2003 |
| CN | 1502146 | A | 6/2004 |
| CN | 1529924 | A | 9/2004 |
| CN | 101052906 | A | 10/2007 |
| CN | 101055956 | A | 10/2007 |
| CN | 201839566 | U | 5/2011 |
| CN | 102449516 | A | 5/2012 |
| CN | 102842784 | A | 12/2012 |
| CN | 102882032 | A | 1/2013 |
| CN | 103038943 | A | 4/2013 |
| CN | 202930669 | U | 5/2013 |
| CN | 103918132 | A | 7/2014 |
| CN | 203871547 | U | 10/2014 |
| EP | 0693795 | A1 | 1/1996 |
| EP | 0692178 | B1 | 4/1998 |
| JP | 2012-119263 | A | 6/2012 |
| WO | WO 00/050942 | A1 | 8/2000 |
| WO | WO 02/058191 | A2 | 7/2002 |
| WO | WO 02/101882 | A2 | 12/2002 |
| WO | WO 2010/126492 | A1 | 11/2010 |
| WO | WO 2019/162067 | A1 | 8/2019 |

* cited by examiner

SELECTIVELY PLATED PLASTIC PART

RELATED APPLICATIONS

This Application is a Continuation of U.S. application Ser. No. 17/356,156, filed Jun. 23, 2021, entitled "SELECTIVELY PLATED PLASTIC PART", which is a Continuation of U.S. application Ser. No. 16/741,562, filed Jan. 13, 2020, entitled "SELECTIVELY PLATED PLASTIC PART", which is a Continuation of U.S. application Ser. No. 15/759,091, filed Mar. 9, 2018, entitled "SELECTIVELY PLATED PLASTIC PART", which is a U.S. national stage filing under 35 U.S.C. 371 of International Patent Application Serial No. PCT/US2016/051079, filed Sep. 9, 2016, entitled "SELECTIVELY PLATED PLASTIC PART", which claims priority to and the benefit under 35 USC 119(e) to U.S. Provisional Application Ser. No. 62/217,184, filed Sep. 11, 2015, entitled "SELECTIVELY PLATED PLASTIC PART", each application of which is herein incorporated by reference in its entirety.

BACKGROUND

Technical Field

The exemplary and non-limiting embodiments relate generally to an electrical connector and, more particularly, to an electrical connector having a Selectively Plated Plastic Part (SPPP).

Brief Description of Prior Developments

Members which are Selectively Plated Plastic Parts (SPPP) are known.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
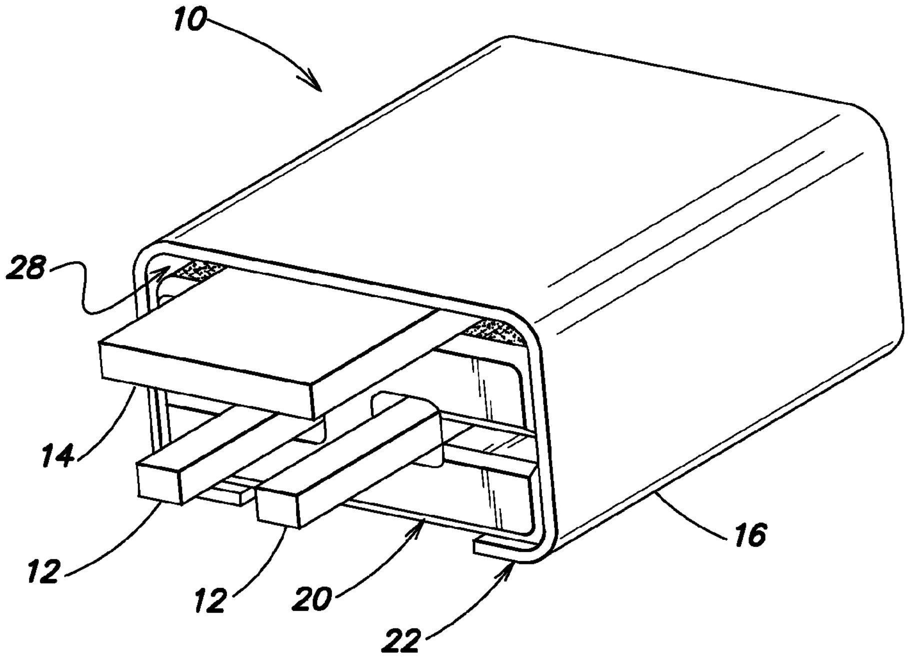
FIG. 1 is a perspective view of an example embodiment.

Referring to FIG. 1, there is shown a perspective view of an electrical connector 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

Figure 2:
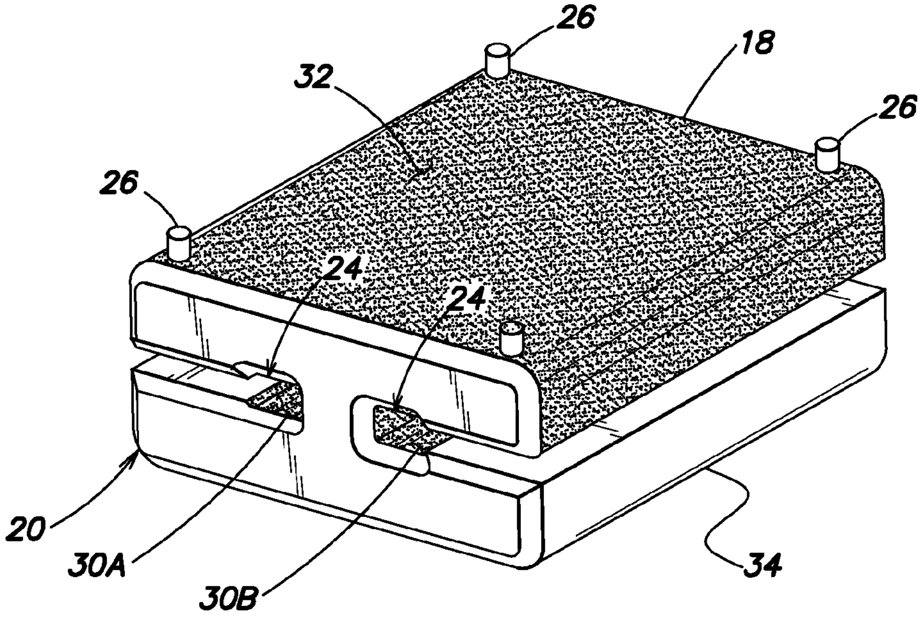
FIG. 2 is a perspective view of one of the components used in the example shown in FIG. 1.

FIG. 1 shows the electrical connector 10 having conductors 12, 14 of a mating electrical connector connected thereto. Referring also to FIG. 2, the connector 10 generally comprises a housing 16 and electrically conductive plating 18. In this example the housing 16 comprises a first housing member 20 and a second housing member 22. The first housing member 20 is made of plastic, such as molded plastic or polymer material.

In this example the first housing member 20 has a general "H" shaped cross section forming two contact receiving channels 24 therein. The "H" shape creates two contact regions partially enclosed by second housing member 22. Such a configuration may be suitable for creating contact regions for signal conductors forming a differential pair. It should be appreciated that a connector may be constructed in which more or fewer signal conductors are grouped, with each group being surrounded by a second housing member.

The "H" shape also proves opposing members at each contact region. The H shape provides compliance to one or both of these members such that force may be applied to a surface of a conducting member (such as a conductor 12) inserted between the opposing member. Such force may be generated by sizing receiving channel 24 formed between the opposing members to be slightly smaller than conductor 12 such that insertion of conductor 12 deflects one or both of the opposing members, and creating contact force. Alternatively or additionally, a member surrounding housing member 20 may generate force on the opposing members, busing them together to generate force on a conductor inserted in the channel. For example, second housing member 22 may act as a clip, constricting the first housing member to urge the opposing members together, and closing receiving channel 24.

A top side of the first housing member 20 also includes standoffs 26. The standoffs 26 may create separation between the first housing member and the second housing member for insertion of a conductor, such as conductor 14, which may serve as a ground or reference conductor. Conductors 12 and 14 may be a portion of a connector 10 to be mated with connector 10. Within the mating connector, impedance of the signal conductors 12 may be influenced by the spacing between conductors 12 and 14. Desirably, this impedance may be maintained through the mating interface illustrated in FIG. 1. Impedance of transmission lines defined by the electrically conductive plating 18 of the first contact receiving channels 24 remains constant even if there are no connector pins 12 received in the contact receiving channels 24.

The second housing member 22 is attached to the first housing member 20 and generally surrounds the first housing member 20. In one example the second housing member 20 forms a clip which is attached to the first housing member and retained thereon by a force caused by resilient deflection of the second housing member when it is clipped to the first housing member. Additional or alternative means may be provided to attached the two housing members to one another. The second housing member may comprise metal or plastic for example. When the second housing member 22 is attached to the first housing member 20, the second housing member 22 rests on top of the standoffs 26. Thus, a second contact receiving channel 28 is formed between the first and second housing members 20, 22 on the exterior side of the first housing member 20 in an area between the standoffs 26.

The electrically conductive plating 18 is applied to the first housing member 20. In this example the electrically conductive plating 18 includes first sections 30A, 30B along each one of the first contact receiving channels 24, and a second section 32 along an exterior side of the first housing member 20 (particularly at the second contact receiving channel 28).

In some embodiments, the plating will be discontinuous. As can be seen in FIG. 2, the plating regions 30A and 30B may be electrically separated from each other. Plating region 18 may be electrically separate from both plating regions 30A and 30B. Suitable conductor material is provided to connect the first sections 30A, 30B to contact areas at the bottom side 34 of the first housing member 20. Thus, the bottom side can be attached to a printed circuit board, for example, to electrically connect the first sections 30A, 30B to the printed circuit board. Likewise, the second housing member 22 can be connected to the printed circuit board, such as at a ground contact area, to electrically connect the second housing member 22 and the second section 32 to ground.

Figure 3:
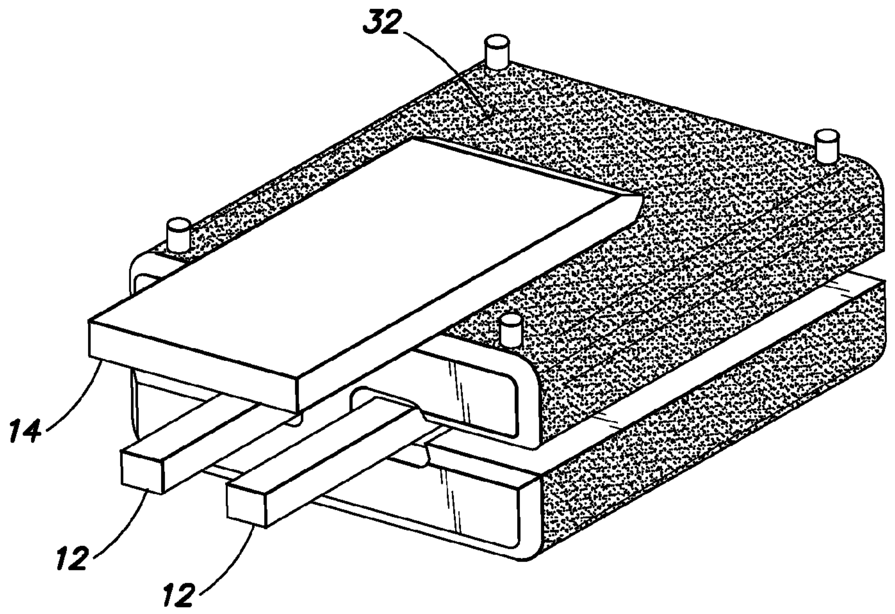
FIG. 3 is a perspective view of the component shown in FIG. 2 showing the contacts of a mating connector attached thereto.

Referring also to FIG. 3, two connector pins 12 of the mating electrical connector can be inserted into the two contact receiving channels 24 to electrically connect the pins 12 to the two first sections 30A, 30B. This electrically contacts the pins 12 to the printed circuit board. The connector blade 14 of the mating connector can be received into the second contact receiving channel 28 and make electrical contact to the printed circuit board via the second section 32 and/or the second housing member 22.

With these types of features, a selectively plated plastic member at a separable interface may be used for a high speed connector. The high speed connector may be, for example, a backplane connector, or a mezzanine connector, or an Input Output (IO) application. Such a connector may have multiple signal conductors or pairs of signal conductors, such that the elements shown in FIGS. 1-3 would be understood to relate to a portion of a connector. A full connector may have multiple such elements, held together in an insulative or conducting housing, or in any other suitable way, to form a connector.

Figure 4:
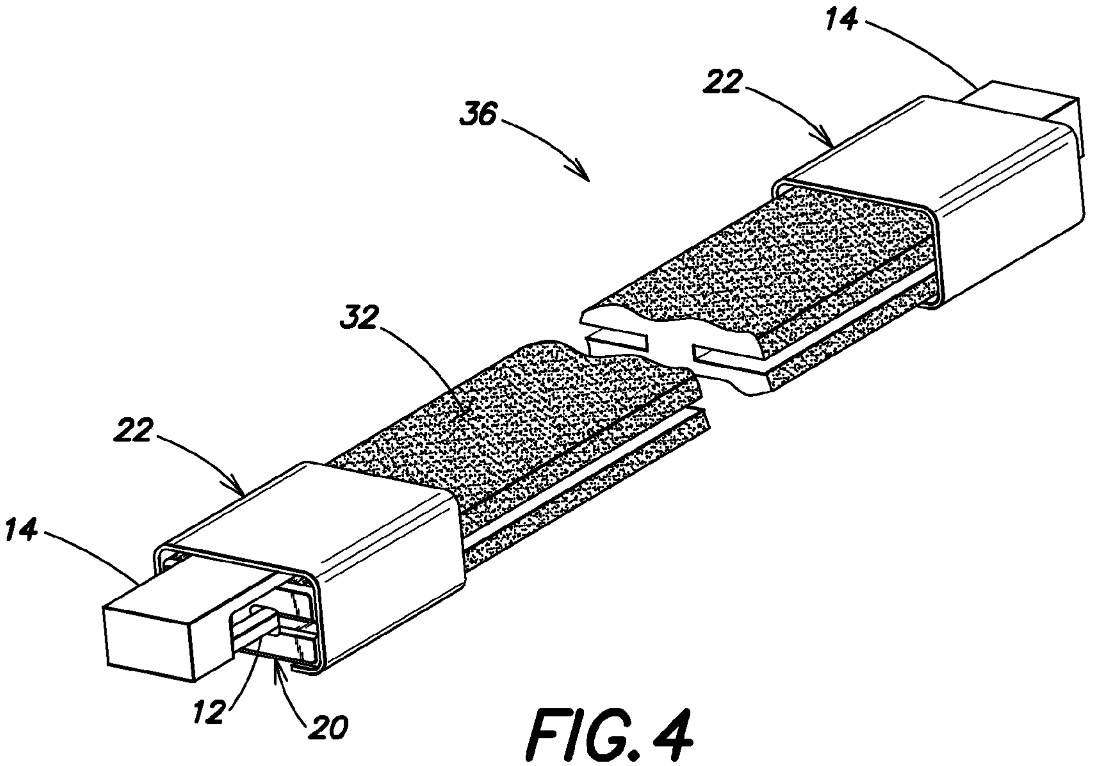
FIG. 4 is a perspective view of another example embodiment.

Referring also to FIG. 4, an alternative example may be provided in a transmission line 36 using an elongated electrically conductive plated plastic member 20' and end clips 22. One benefit is improved impedance consistency. As shown in the drawings, the metalized plastic can form a cable (the outer insulative jacket is not shown) or other transmission path. Mating connector pins 12 are inserted into the ends of the metalized plastic body. The wider pin 14 is a ground pin, and the two smaller pins 12 are the signal pins. The ground pin is electrically isolated from the signal pins.

The outer second section 32 of the plating may be connected to ground, and the two smaller internal plated areas may be for signal paths. The outer second section 32 of the plating extends the length of the H-shaped, metalized plastic housing member.

In one example of a manufacturing method, the entire part 20 or 20' can be plated by vapor deposition and then machined to remove unwanted plating. The H-shaped housing member can also be molded as two sections and attached along a horizontal split (black line) through the center of the I-beam shape. Other suitable methods are also acceptable.

In some embodiments, the first and second housing members may each be unitary structures. Alternatively or additionally, either or both may be formed from multiple components. For example, in a two-ended structure as shown FIG. 4, each end of the connector may have a separate component acting as an inner housing.

In the example of FIG. 4, each end is the same. However, it is not a requirement that ends be the same. In some embodiments, for example, one end may be configured to receive conductors from a mating connector. A second end may be configured to attach to a printed circuit board or other substrate. That end, for example, may be configured to receive pins or other conductive elements that can be inserted into a via in a printed circuit board or otherwise attached to a substrate.

As another example, the portions between the two ends may be made differently than the portions at the ends. An end may have a housing made of plated plastic as described above. That housing may have two faces. One face may have openings to receive conductors from a mating connector, such as with the configuration shown in FIG. 3. With channels running through the housing, there may be openings on a second face. Other types of conductors may be inserted into openings in the second face. As a specific example, conductors that are or attached to conductors or a cable may be inserted into the openings in the second face. In this way a connector having the characteristics of connector 10 housing may terminate a cable. Additionally, it should be appreciated that other types of elements may be inserted into openings in the second face to achieve different types of structures. For example, pins or other contacts for mounting to a printed circuit board may be inserted in the second face. Regardless off rom and purpose, the elements in the second face may make electrical contact to the plated plastic, forming electrical connections to the conductors, such as 12 and 14 inserted into the first face.

In one example the clips 22 are compression clips that simultaneously provide normal force on all of the mating pins 12, 14. The standoffs 26 are provided so that the clips 22 to not flop around when the header pins 12, 14 are not yet inserted into the metalized plastic body.

Using a Selectively Plated Plastic Part (SPPP) 20, 30, 32 as the separable interface enables all of the critical dimensions (for impedance) to be controlled by one piece. This provides consistency. To mate to this part, pins 12 are inserting into internal (plated) cavities 24, 30 and a blade 14 is fitted to the side of the part to connect to the plating 32 which may also act as a ground shield. The first sections 30A, 30B may form a differential pair of conductors, and the plating 32 may act as the ground shield for that differential pair. The clip 22 may compress the whole thing together to provide the contact force.

In an IO application such as shown in FIG. 4, the SPPP is extending to be a cable, and the compressive clips 22 are applied at both ends as well as mating interfaces. In these examples differential pairs were used to demonstrate the concept, but it could be applied to different configurations.

An example embodiment may be provided in an electrical connector comprising a housing comprising a first member and a second member, where the first member is made of plastic and forms at least one first contact receiving channel therein, where the second member is attached around the first member, and where the first and second members form at least one second contact receiving channel therebetween; and electrical conductor plating on the first member, where the electrical conductor plating comprises at least one first section along the at least one first contact receiving channel and at least one second section along an exterior side of the first member at the at least one second contact receiving channel, and where the first and second sections of the electrical conductor plating are electrically separate from one another.

An example embodiment may be provided in an electrical connector comprising: a housing comprising a first member made of an electrically insulative material that forms at least one first contact receiving channel therein; and electrical conductor plating on the first member, where the electrical conductor plating comprises at least one first section along the at least one first contact receiving channel and at least one second section along an exterior side of the first member where the first and second sections of the electrical conductor plating are electrically separate from one another.

The first section may be configured to transmit signals. The second section may be configured to be electrically connected to one of power or ground. The at least one first contact receiving channel may define two contact receiving channels that are electrically isolated from one another. The two contact receiving channels may be configured to carry differential signals and have a differential impedance of 100±10 Ohms or 85±10 Ohms. The differential impedance might not change even if there are no connector pins received in one or both of the two contact receiving channels. The electrical connector may further comprise a second member, wherein the second member is attached around the first member, and where the first and second members form at least one second contact receiving channel therebetween. The two contact receiving channels may be C-shaped and are oriented in a mirror image with respect to one another. The C-shaped two contact receiving channels may be oriented back-to-back with openings extending away from each other. The housing may be mechanically flexible. The housing may be part of an electrical cable assembly.

An example embodiment may be provided in an electrical connector comprising: a housing comprising a first member made of plastic that forms at least one first contact receiving channel therein, the at least one first contact receiving channel defined by only three closed walls to form a partially open C-shaped cavity; and electrical conductor plating on the first member, where the electrical conductor plating comprises at least one first section along the at least one first contact receiving channel.

The first section may be configured to transmit signals. The electrical conductor plating may further comprise at least one second section along an exterior side of the first member at an at least one second contact receiving channel, and where the first and second sections of the electrical conductor plating are electrically separate from one and the second section is configured to be electrically connected to one of power or ground. The at least one first contact receiving channel may define two contact receiving channels that are electrically isolated from one another. The two contact receiving channels may be configured to carry differential signals and have a differential impedance of 100±10 Ohms or 85±10 Ohms. In one example it may be configured such that the differential impedance does not change even if there are no connector pins received in one or both of the two contact receiving channels. The electrical connector may further comprise a second member, wherein the second member is attached around the first member, and where the first and second members form at least one second contact receiving channel therebetween. The two contact receiving channels may be C-shaped and are oriented in a mirror image with respect to one another. The C-shaped two contact receiving channels may be oriented back-to-back with openings extending away from each other. The housing may be at least partially mechanically flexible. The housing may be part of an electrical cable assembly.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An electrical connector configured to terminate a cable, the electrical connector comprising:
- a plastic housing, comprising:
  - a first channel within the plastic housing configured to receive a first conductor of the cable; and
  - a second channel within the plastic housing configured to receive a second conductor of the cable,
  - wherein the first and second channels are configured to form a differential pair comprising the first and second conductors when the first and second conductors are received in the first and second channels; and
- electrically conductive plating on an exterior surface of the plastic housing and configured to provide a ground shield for the differential pair.

2. The electrical connector of claim 1, wherein the electrically conductive plating is electrically separate from the first and second channels.

3. The electrical connector of claim 1, wherein the plastic housing comprises a first face and a second face opposite the first face, the first and second faces having openings in communication with the first and second channels.

4. The electrical connector of claim 3, wherein the first and second faces comprise openings, the openings of the second face configured to receive the first and second conductors of the cable and the openings of the first face configured to allow the first and second conductors of the cable to connect to another electrical connector.

5. The electrical connector of claim 1, wherein the electrically conductive plating is disposed on at least three sides of the first and second channels.

6. The electrical connector of claim 5, wherein the electrically conductive plating is disposed on a first side, a second side, a third side, and a fourth side of the first and second channels.

7. The electrical connector of claim 5, wherein the plastic housing comprises a plastic housing member having the first and second channels within the plastic housing member and the electrically conductive plating on an exterior surface of the plastic housing member.

8. The electrical connector of claim 7, wherein the electrically conductive plating is disposed on a first side, a second side, and a third side of the plastic housing member.

9. The electrical connector of claim 7, wherein the first and second channels comprise partially closed cavities.

10. The electrical connector of claim 1, wherein the plastic housing comprises:
- a plastic housing member having the exterior surface with the electrically conductive plating thereon; and
- a conductive housing member attached to the plastic housing member and electrically coupled to the electrically conductive plating.

11. The electrical connector of claim 10, wherein the conductive housing member is configured to electrically connect the electrically conductive plating to ground.

12. The electrical connector of claim 1, wherein the electrical connector is configured to receive a pair of signal conductors of another connector and electrically connect the pair of signal conductors to the first and second conductors of the cable.

13. The electrical connector of claim 1, wherein the electrically conductive plating is plated using vapor deposition.

14. An electrical cable assembly comprising:

an electrical cable comprising:

a first conductor and a second conductor configured as a differential pair; and a ground conductor; and the electrical connector of claim 1 at an end of the cable, with the first conductor received in the first channel, the second conductor received in the second channel, and the ground conductor electrically connected to the electrically conductive plating.

15. An electrical cable termination device, comprising:

an insulative housing comprising:

a first path through the insulative housing configured to receive a first cable conductor of a pair of differential cable conductors; and a second path through the insulative housing configured to receive a second cable conductor of the pair of differential cable conductors; and electrically conductive plating on a surface of the insulative housing configured to provide a ground return path for signals propagating in the first and second cable conductors.

16. The electrical cable termination device of claim 15, wherein the electrically conductive plating is electrically separate from the first and second paths.

17. The electrical cable termination device of claim 15, wherein the electrically conductive plating is configured to contact a ground conductor that surrounds the pair of differential cable conductors.

18. The electrical cable termination device of claim 15, further comprising:

a cable mounting interface at a first end of the insulative housing configured to receive the first and second cable conductors; and a mating interface at a second end of the insulative housing configured to electrically connect the first and second cable conductors to an electrical connector, wherein the cable mounting interface and the mating interface comprise openings in communication with the first and second paths.

19. The electrical cable termination device of claim 18, wherein the first and second paths run at least partially through the insulative housing from the cable mounting interface to the mating interface.

20. The electrical cable termination device of claim 18, wherein the openings of the cable mounting interface are configured to receive the first and second cable conductors and the openings of the mating interface are configured to allow the first and second cable conductors to connect to another electrical connector.

21. The electrical cable termination device of claim 15, wherein the electrically conductive plating is disposed on at least three sides of the first and second paths.

22. The electrical cable termination device of claim 21, wherein the electrically conductive plating is disposed on a first side, a second side, a third side, and a fourth side of the first and second paths.

23. The electrical cable termination device of claim 22, wherein the insulative housing comprises an insulative member having the first and second paths within the insulative member and the electrically conductive plating on an exterior surface of the insulative member.

24. The electrical cable termination device of claim 23, wherein the electrically conductive plating is disposed on a first side, a second side, and a third side of the insulative member.

25. The electrical cable termination device of claim 23, wherein the first and second paths comprise partially closed cavities through the insulative member.

26. The electrical cable termination device of claim 25, wherein the partially closed cavities are C-shaped.

27. The electrical cable termination device of claim 15, wherein the insulative housing comprises:

an insulative member having the surface with the electrically conductive plating thereon; and a conductive member at least partially surrounding the insulative member and electrically coupled to the electrically conductive plating, wherein the conductive member is configured to electrically connect the electrically conductive plating to ground.

28. The electrical cable termination device of claim 15, wherein the electrical cable termination device is configured to receive a pair of signal conductors of a connector and electrically couple the pair of signal conductors to the first and second cable conductors.

* * * * *